United States Patent
Sasaki et al.

(10) Patent No.: US 7,440,229 B2
(45) Date of Patent: Oct. 21, 2008

(54) THIN-FILM MAGNETIC HEAD HAVING A WRITE SHIELD LAYER

(75) Inventors: Yoshitaka Sasaki, Santa Clara, CA (US); Lijie Guan, Milpitas, CA (US); Hiroyuki Ito, Sunnyvale, CA (US); Dong Hong Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 328 days.

(21) Appl. No.: 10/912,245

(22) Filed: Aug. 6, 2004

(65) Prior Publication Data

US 2005/0280939 A1 Dec. 22, 2005

Related U.S. Application Data

(60) Provisional application No. 60/580,368, filed on Jun. 18, 2004.

(51) Int. Cl.
*G11B 5/127* (2006.01)
(52) U.S. Cl. .................................. 360/125.22
(58) Field of Classification Search ................ 360/126, 360/125.02–125.04, 125.17, 125.34, 125.5, 360/125.45, 125.43, 125.16, 125.06, 125.09, 360/125.1, 125.13, 125.14, 125.22–125.26
See application file for complete search history.

(56) References Cited

U.S. PATENT DOCUMENTS

| | | | |
|---|---|---|---|
| 4,656,546 A | 4/1987 | Mallory | 360/110 |
| 4,672,493 A | 6/1987 | Schewe | 360/125.15 |
| 6,504,675 B1 | 1/2003 | Shukh et al. | 360/125.12 |
| 6,530,141 B2 | 3/2003 | Komuro et al. | |
| 6,728,064 B2 * | 4/2004 | Sato et al. | 360/126 |
| 6,757,141 B2 * | 6/2004 | Santini et al. | 360/317 |
| 6,801,407 B2 * | 10/2004 | Sasaki et al. | 360/317 |
| 7,002,775 B2 * | 2/2006 | Hsu et al. | 360/125.03 |
| 7,054,105 B2 * | 5/2006 | Mochizuki et al. | 360/125 |
| 7,102,854 B2 * | 9/2006 | Wang et al. | 360/125.5 |
| 7,140,095 B2 * | 11/2006 | Matono | 29/603.15 |
| 7,187,519 B2 * | 3/2007 | Stageberg et al. | 360/125.04 |
| 7,271,982 B2 * | 9/2007 | MacDonald et al. | 360/125.02 |
| 2002/0109946 A1 * | 8/2002 | Sato et al. | 360/317 |
| 2003/0021064 A1 * | 1/2003 | Ohtomo et al. | 360/126 |
| 2003/0189787 A1 * | 10/2003 | Matono et al. | 360/126 |
| 2004/0037002 A1 | 2/2004 | Kudo et al. | |
| 2004/0150912 A1 * | 8/2004 | Kawato et al. | 360/126 |

FOREIGN PATENT DOCUMENTS

| | | |
|---|---|---|
| JP | A 2003-203311 | 7/2003 |
| JP | A 2003-242607 | 8/2003 |
| JP | A 2004-094997 | 3/2004 |

\* cited by examiner

*Primary Examiner*—Wayne Young
*Assistant Examiner*—Matthew G Kayrish
(74) *Attorney, Agent, or Firm*—Oliff & Berridge, PLC

(57) ABSTRACT

A thin-film magnetic head has a laminated construction comprising a main pole layer having a magnetic pole tip on a side of the medium-opposing surface opposing a recording medium, a write shield layer opposing the magnetic pole tip forming a recording gap layer, on the side of the medium-opposing surface, and a thin-film coil wound around at least a portion of the write shield layer. The thin-film magnetic head has an upper yoke pole layer having a larger size than the portion of the main pole layer which is more distant from the medium-opposing surface than the recording gap layer, wherein the upper yoke pole layer is joined to the side of the main pole layer which is near the thin-film coil.

15 Claims, 22 Drawing Sheets

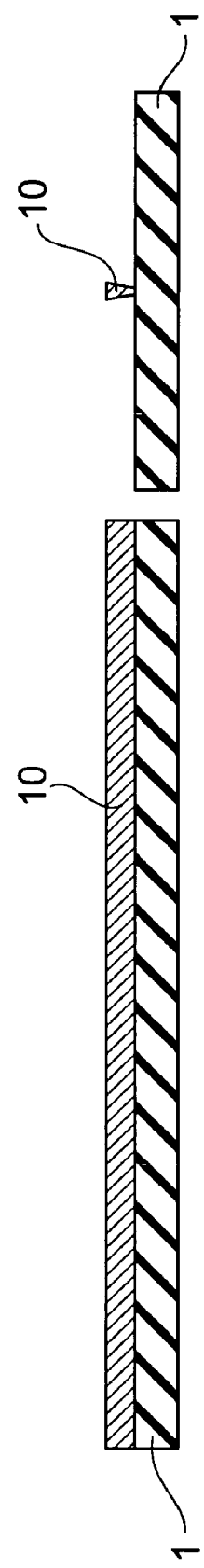

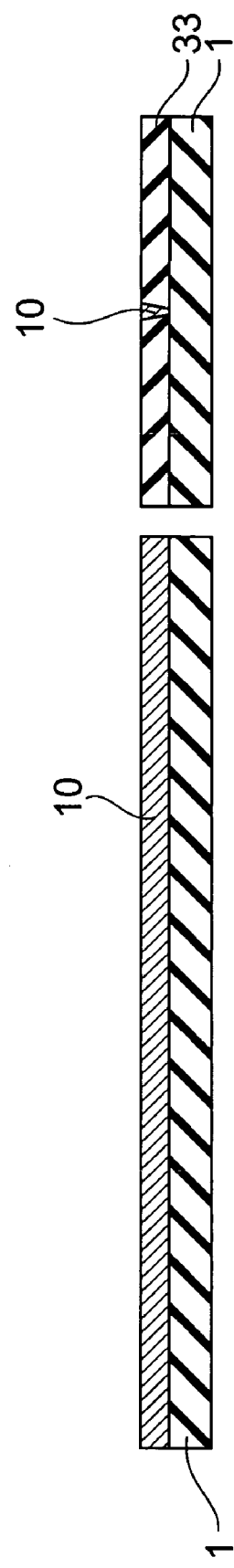

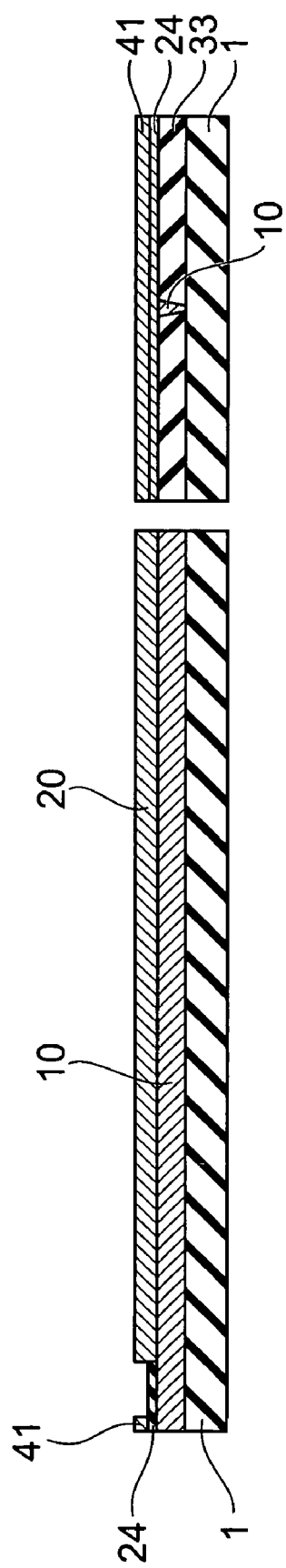

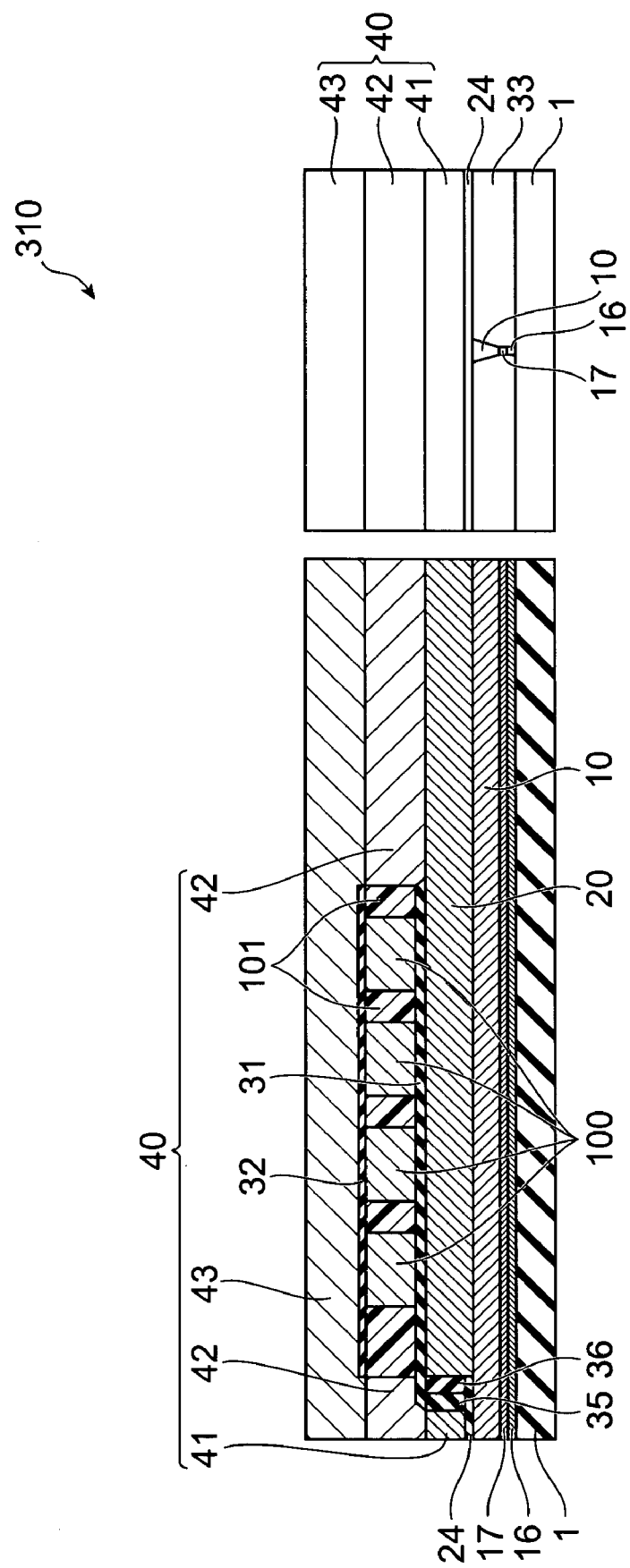

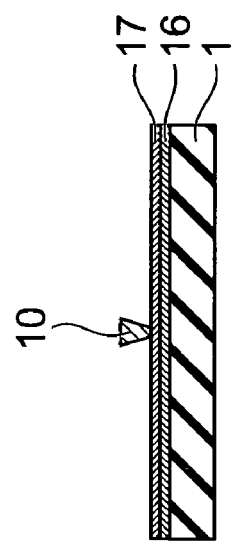
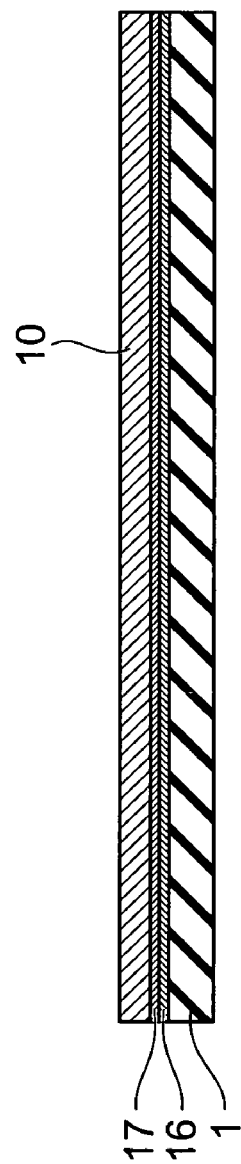
Fig.10A
Fig.10B

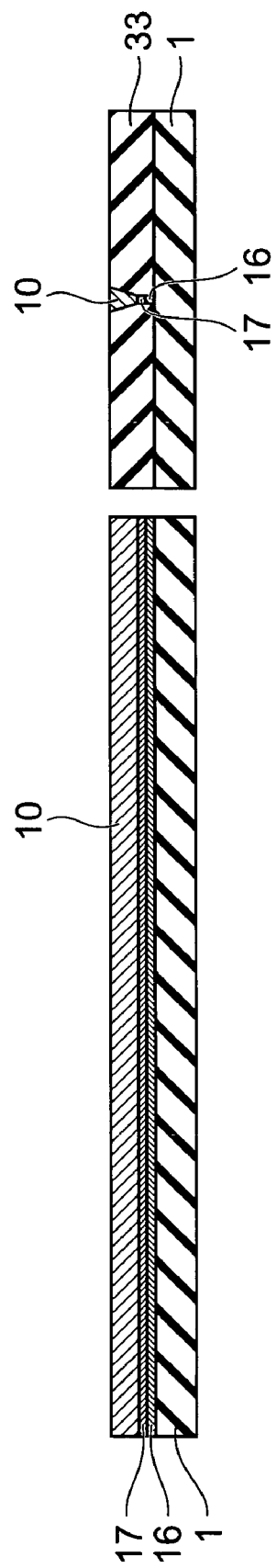

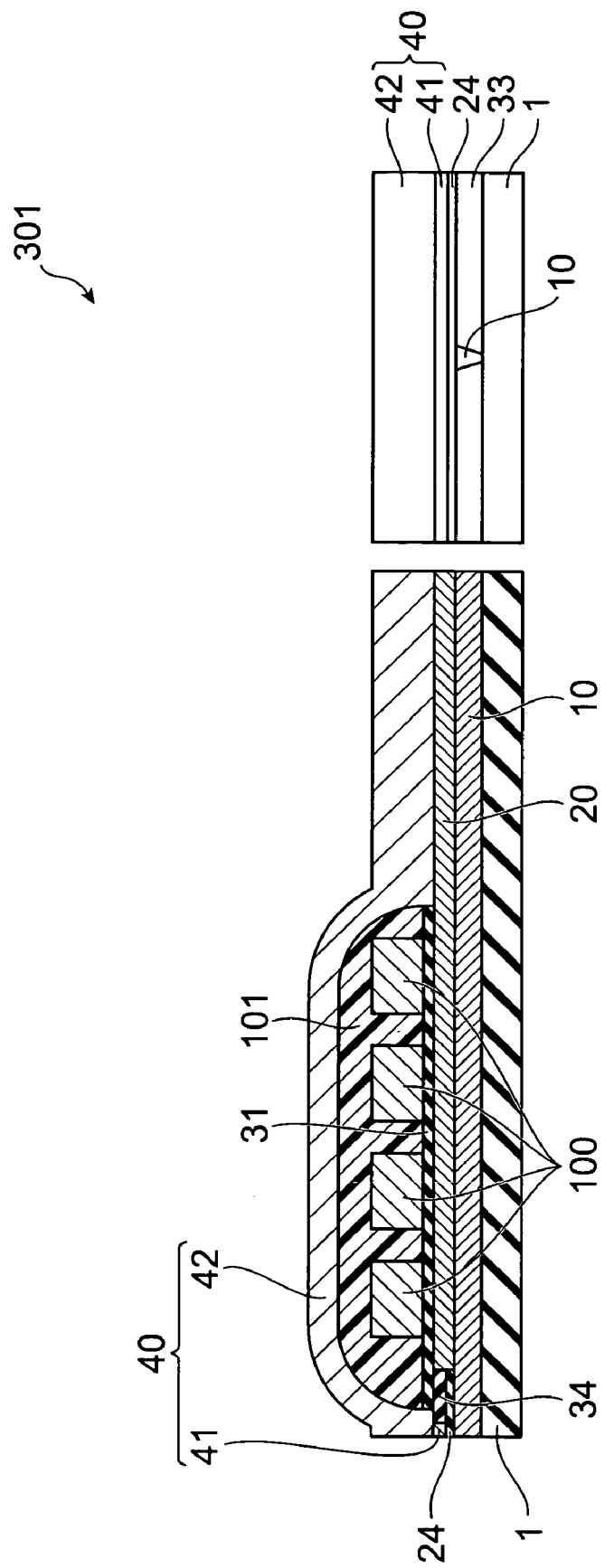

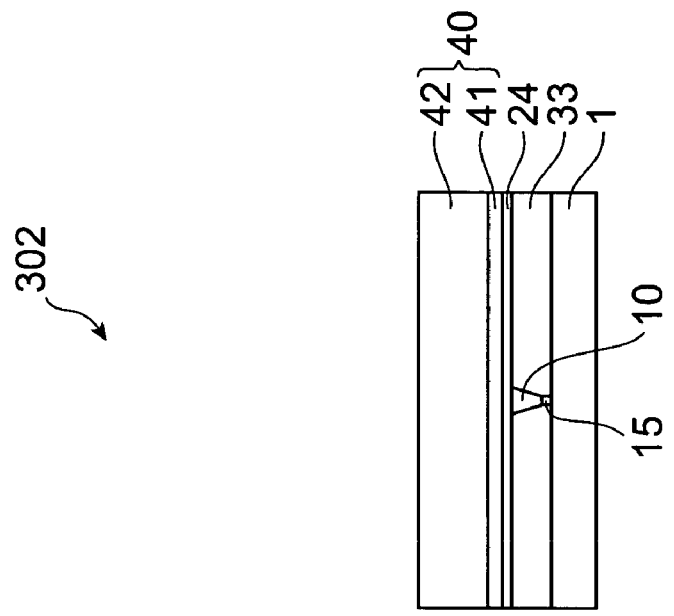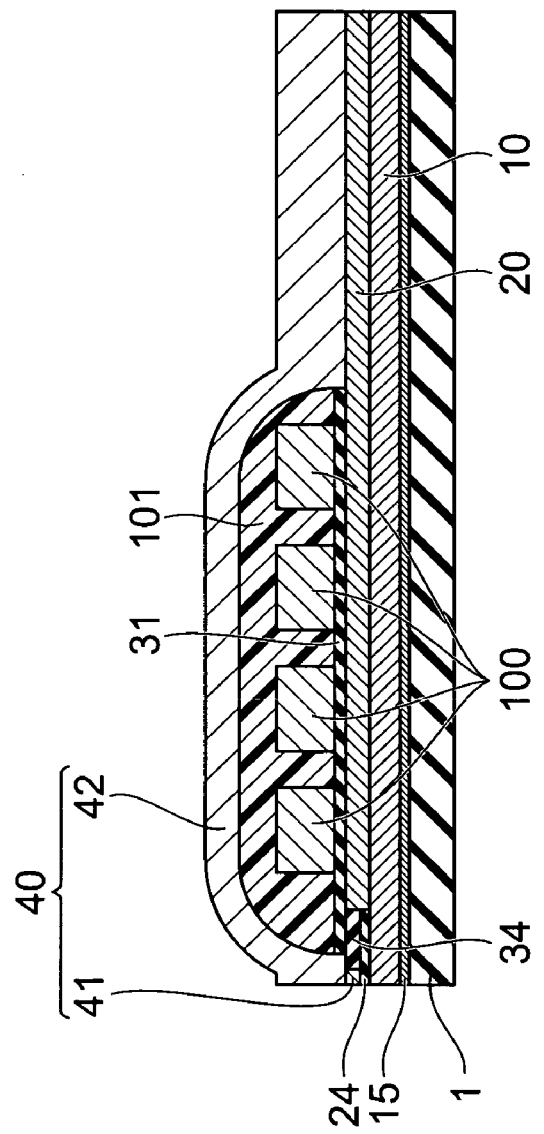

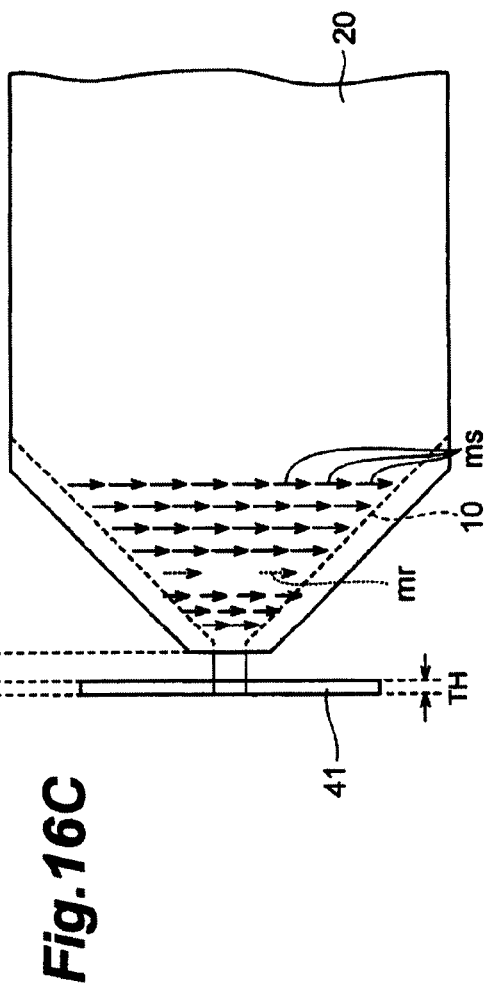

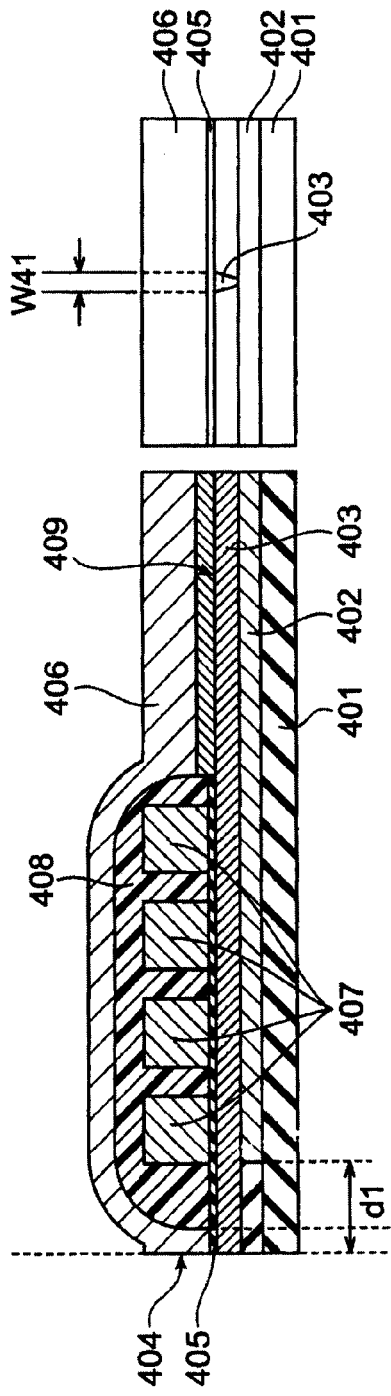
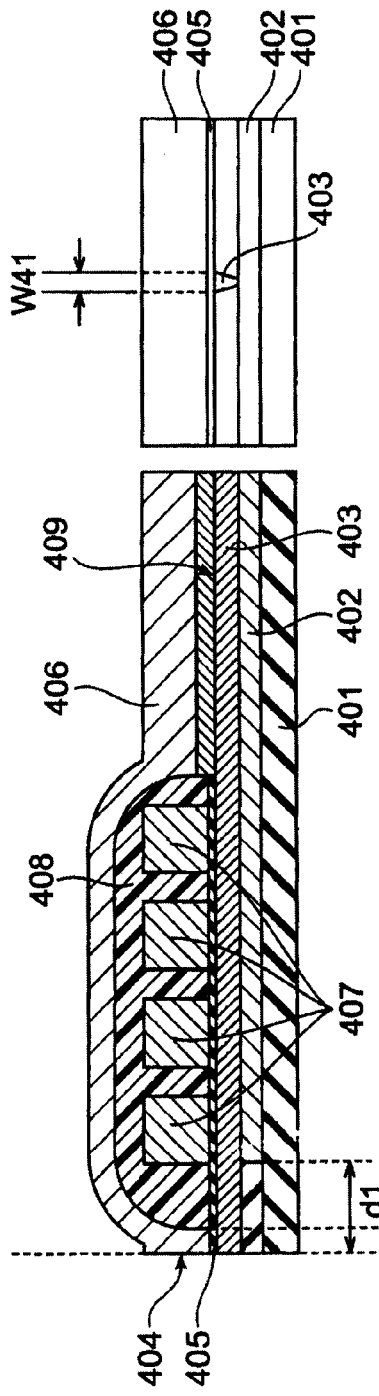
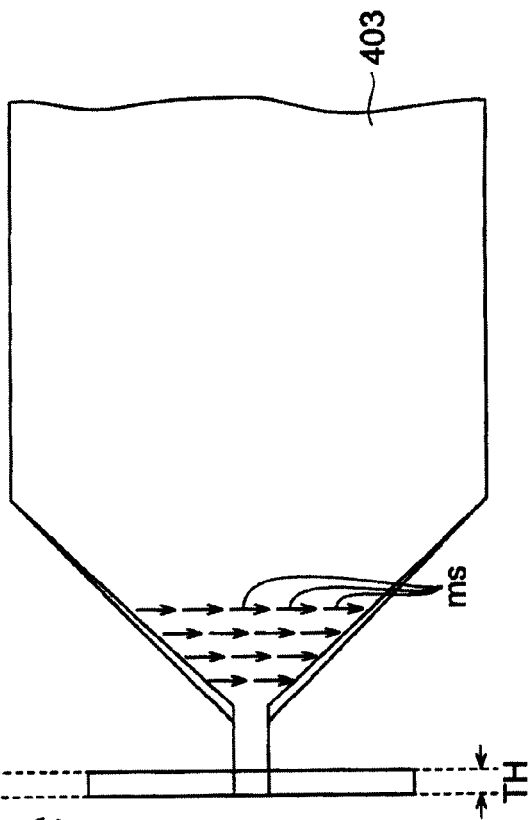
Fig. 22A PRIOR ART
Fig. 22B PRIOR ART
Fig. 22C PRIOR ART

THIN-FILM MAGNETIC HEAD HAVING A WRITE SHIELD LAYER

CROSS REFERENCE TO RELATED APPLICATIONS

This application claims priority to Provisional Application No. 60/580,368, filed on Jun. 18, 2004, which is hereby incorporated by reference in its entirety.

BACKGROUND OF THE INVENTION

1. Field of the Invention

The present invention relates to a thin-film magnetic head which performs magnetic recording operation by a perpendicular recording system, a method of manufacturing the same, a head gimbal assembly and hard disk drive.

2. Related Background Art

Surface recording densities in hard disk drives have improved dramatically in recent years. More particularly, surface recording densities in hard disk drives have recently reached 160-200 Gbytes/platter, and are poised to exceed even this level. At the same time, there has been a demand for improved performance of thin-film magnetic heads.

Thin-film magnetic heads are largely classified based on their recording systems, which may be divided into longitudinal recording systems wherein information is recorded in the (longitudinal) direction within the recording surface of the hard disk (recording medium), and perpendicular recording systems wherein the orientation of recording magnetization formed on the hard disk is formed in the perpendicular direction of the recording surface to record data. Of these types of systems, perpendicular recording type thin-film magnetic heads are capable of realizing markedly higher recording density than longitudinal recording systems, while they also are less susceptible to thermal fluctuation of the recorded hard disk, and are therefore more promising than longitudinal recording systems.

Conventional perpendicular recording type thin-film magnetic heads are disclosed, for example, in U.S. Pat. Nos. 6,504,675, 4,656,546, 4,672,493 and Japanese Unexamined Patent Publication No. 2004-94997.

Incidentally, when thin-film magnetic heads of perpendicular recording systems accomplish recording of data in the inner and outer perimeters of hard disks, the magnetic pole tip situated on the side of the medium-opposing surface (also referred to air bearing surface, or ABS), which opposes the recording medium (hard disk), forms an angle (skew angle) with the data recording track. When the writing performance is high with a perpendicular recording type magnetic head (perpendicular magnetic recording head: hereinafter also referred to as "PMR"), this skew angle is responsible for a problem of side fringe, whereby excess data is recorded between adjacent tracks. When side fringe occurs, it can adversely affect detection of the servo signal, or the S/N ratio of the reproduction waveform. Conventional PMRs therefore have a bevel shape wherein the magnetic pole tip on the ABS side of the main pole gradually narrows in width toward one direction. (In this regard, see Japanese Unexamined Patent Publication No. 2003-242607 and Japanese Unexamined Patent Publication No. 2003-203311.)

SUMMARY OF THE INVENTION

Conventional PMRs include a thin-film magnetic head 400 having the structure shown in FIGS. 22(A), (B) and (C), for example. The thin-film magnetic head 400 comprises a lower yoke layer 402 which is formed on an insulating layer 401, and a main pole layer 403 which has beveled magnetic pole tip disposed at the ABS 404 side, a write shield layer 406 magnetically connected with the main pole layer 403, opposite the main pole layer 403 and sandwiching a recording gap layer 405 on the ABS 404 side, and a thin-film coil 407. The thin-film coil 407 is internally insulated each other by a photoresist 408, and is wound in a planar spiral fashion around a connecting member 409 which connects the main pole layer 403 and the write shield layer 406.

In the thin-film magnetic head 400, data recording is accomplished by the recording gap layer 405. The width W41 near the thin-film coil 407 at the ABS 404 of the magnetic pole tip constitutes the track width, and the hard disk recording density is determined by this width W41. The throat height TH is determined by the distance from the ABS 404 of the write shield layer 406 to the photoresist 408.

On the other hand, PMRs with narrower track widths such as the thin-film magnetic head 400 are desirable for improved recording density. Also, a satisfactory overwrite characteristic is preferred, so that data recorded on the recording medium is not overwritten by other data. Consequently, a structure is preferred wherein the lower yoke layer 402 is as close as possible to the ABS 404.

However, since the thin-film magnetic head 400 has the main pole layer 403 formed after the lower yoke layer 402, forming the main pole layer 403 with a beveled magnetic pole tip affects the lower yoke layer 402 to produce a neck height (hn) as shown in the drawing, and this has lengthened the narrow portion of the width corresponding to the track width by the degree of the neck height hn, potentially resulting in a shift from the designed length. Therefore, the lower yoke layer 402 must be formed distant from the ABS 404 so that d1 is 0.1-0.3 µm as shown in the drawing, making it difficult to increase the magnetic charge (also known as magnetic volume) at the location near the ABS 404. Consequently, in a thin-film magnetic head 400, there is a problem which achieving a satisfactory overwrite characteristic is difficult.

It is an object of the present invention, which has been accomplished in light of the problems described above, to provide a thin-film magnetic head having a structure which allows a satisfactory overwrite characteristic to be achieved, as well as a method of manufacturing the same, a head gimbal assembly and a hard disk drive.

In order to solve the aforementioned problems, the invention provides a thin-film magnetic head having a laminated construction comprising a main pole layer having a magnetic pole tip on a side of the medium-opposing surface opposing a recording medium, a write shield layer opposing the magnetic pole tip forming a recording gap layer, on the side of the medium-opposing surface, and a thin-film coil wound around at least a portion of the write shield layer, and comprising an upper yoke pole layer having a larger size than the portion of the main pole layer which is more distant from the medium-opposing surface than the recording gap layer, wherein the upper yoke pole layer is joined to the side of the main pole layer which is near the thin-film coil.

The thin-film magnetic head has an upper yoke pole layer, having a larger size than the portion of the main pole layer which is more distant from the medium-opposing surface than the recording gap layer, joined to the side of the main pole layer which is near the thin-film coil.

In the thin-film magnetic head, the write shield layer may also have a shield tip which opposes the magnetic pole tip on the medium-opposing surface, and formed with the same edge surface height as the upper yoke pole layer.

In this thin-film magnetic head, the shield tip absorbs magnetic return from the recording medium.

Preferably, the main pole layer and upper yoke pole layer are formed using magnetic materials with different saturated flux densities, and the saturated flux density of the main pole layer is set higher than the saturated flux density of the upper yoke pole layer.

This will allow the saturated flux density of the magnetic pole tip to be higher, to avoid saturation of the flux even when the track width of the magnetic pole tip is narrowed.

Further, a high tensile strength film made of Ta, W, Mo, TiW, TiN, Cr, NiCr, Mo, Ru or SiN is also preferably provided in contact with the main pole layer.

The high tensile strength film can maintain the direction of remnant magnetization of the main pole layer in the direction along the medium-opposing surface after completion of writing.

Also, preferably the shield tip and the upper yoke pole layer are formed using magnetic materials with different saturated flux densities, and the saturated flux density of the shield tip is set lower than the saturated flux density of the upper yoke pole layer.

In addition, an insulating film by AL-CVD may be formed between the shield tip and the upper yoke pole layer.

The upper yoke pole layer may have an enlarged region wherein the lateral width is enlarged at the side near the medium-opposing surface.

The invention further provides a method of manufacturing a thin-film magnetic head, wherein a thin-film magnetic head is manufactured by laminating a main pole layer having a magnetic pole tip on a side of the medium-opposing surface opposing the recording medium, a write shield layer opposing the magnetic pole tip forming a recording gap layer, on the side of the medium-opposing surface, and a thin-film coil wound around at least a portion of the write shield layer, the method of manufacturing a thin-film magnetic head comprising the following steps (1) to (5).

(1) A step of forming a main pole layer on an insulating layer, in such a manner that it has a magnetic pole tip at the medium-opposing surface side, (2) A step of forming a recording gap layer on the main pole layer, in such a manner that the section at the side distant from the medium-opposing surface of the main pole layer is exposed, (3) A step of forming an upper yoke pole layer having a larger size than the portion of the main pole layer which is more distant from the medium-opposing surface than the recording gap layer, joined with the location not covered by the recording gap layer of the main pole layer, and a shield tip opposing the magnetic pole tip on the medium-opposing surface, in such a manner that the edge surfaces of each are the same height, (4) A step of forming a thin-film coil in such a manner as to contact the upper yoke pole layer via the insulating film, and (5) A step of forming a magnetic shield layer in connection with the shield tip and in connection with the upper yoke pole layer at the side distant from the medium-opposing surface, and forming the write shield layer comprising the magnetic shield layer and the shield tip.

By carrying out each of these steps, it is possible to obtain a thin-film magnetic head wherein the upper yoke pole layer having a larger size than the portion of the main pole layer which is more distant from the medium-opposing surface than the recording gap layer is joined to the main pole layer.

There may also be included a step of forming a high tensile strength film between the main pole layer and the insulating layer.

This will allow manufacture of a thin-film magnetic head having a high tensile strength film in contact with the main pole layer.

The method of manufacturing a thin-film magnetic head as described above may further include a step of subjecting the surface of the main pole layer to annealing.

By carrying out annealing, it is possible to reduce the effect of remnant magnetization inside the main pole layer after completion of writing.

The invention still further provides a head gimbal assembly comprising a thin-film magnetic head formed on a support and a gimbal securing the support, wherein the thin-film magnetic head has a laminated construction comprising a main pole layer having a magnetic pole tip on a side of the medium-opposing surface opposing a recording medium, a write shield layer opposing the magnetic pole tip forming a recording gap layer, on the side of the medium-opposing surface, and a thin-film coil wound around at least a portion of the write shield layer, and comprising an upper yoke pole layer having a larger size than the portion of the main pole layer which is more distant from the medium-opposing surface than the recording gap layer, wherein the upper yoke pole layer is joined at the side of the main pole layer which is near the thin-film coil.

The invention still further provides a hard disk device comprising a head gimbal assembly having a thin-film magnetic head and a recording medium opposing the thin-film recording head, wherein the thin-film magnetic head has a laminated construction comprising a main pole layer having a magnetic pole tip on a side of a medium-opposing surface opposing a recording medium, a write shield layer opposing the magnetic pole tip forming a recording gap layer, on the side of the medium-opposing surface, and a thin-film coil wound around at least a portion of the write shield layer, and comprising an upper yoke pole layer having a larger size than the portion of the main pole layer which is more distant from the medium-opposing surface than the recording gap layer, wherein the upper yoke pole layer is joined to the side of the main pole layer which is near the thin-film coil.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 4(A) and FIG. 4(B) are cross-sectional views, corresponding to FIGS. 1(A) and (B), for a step of manufacturing a thin-film magnetic head according to the first embodiment.

FIGS. 5(A) and (B) are cross-sectional views showing the steps subsequent to FIGS. 4(A) and (B), respectively.

FIGS. 6(A) and (B) are cross-sectional views showing the steps subsequent to FIGS. 5(A) and (B), respectively.

FIG. 9(A) is a cross-sectional view of a thin-film magnetic head according to a second embodiment of the invention, in the direction crossing the thin-film coil, and FIG. 9(B) is a front view showing the ABS.

FIGS. 10(A) and (B) are cross-sectional views, corresponding to FIGS. 9(A) and (B), for a step of manufacturing a thin-film magnetic head according to the second embodiment.

FIGS. 11(A) and (B) are cross-sectional views showing the steps subsequent to FIGS. 10(A) and (B), respectively.

FIGS. 14(A) and (B) are illustrations showing a modification to the thin-film magnetic head of the first embodiment of the invention, wherein FIG. 14(A) is a cross-sectional view and FIG. 14(B) is a front view showing the ABS.

FIGS. 15(A) and (B) are illustrations showing another modification to the thin-film magnetic head of the first embodiment of the invention, wherein FIG. 15(A) is a cross-sectional view and FIG. 15(B) is a front view showing the ABS.

FIGS. 16(A) and (B) are illustrations showing a modification to the thin-film magnetic head of the first embodiment of the invention, wherein FIG. 16(A) is a cross-sectional view and FIG. 16(B) is a front view showing the ABS. FIG. 16(C) is a plan view showing the main pole layer and upper yoke pole layer, together with the direction of internal magnetization.

FIGS. 22(A), (B) and (C) are illustrations of a conventional thin-film magnetic head, wherein FIG. 22(A) is a cross-sectional view, FIG. 22(B) is a front view showing the ABS and FIG. 20(C) is a plan view.

DETAILED DESCRIPTION OF THE REFERRED EMBODIMENTS

Embodiments of the present invention will now be explained in greater detail with reference to the accompanying drawings. Constituents identical to each other will be referred to with numerals identical to each other without repeating their overlapping explanations.

First Embodiment (Structure of Thin-Film Magnetic Head)

Figure 1:
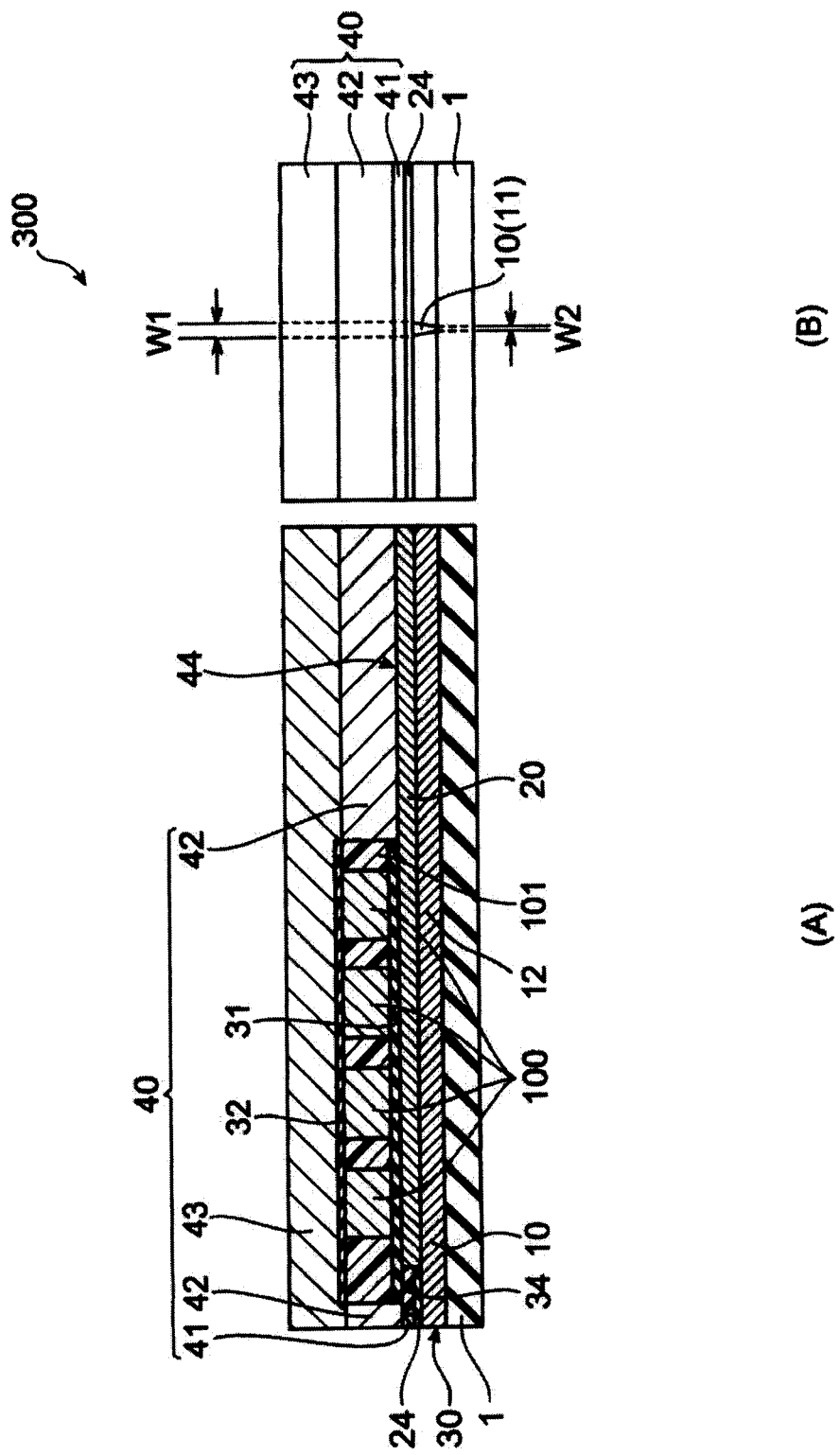
FIG. 1(A) is a cross-sectional view of a thin-film magnetic head according to a first embodiment of the invention, in the direction crossing the thin-film coil.
FIG. 1(B) is a front view showing the ABS.
Figure 2:
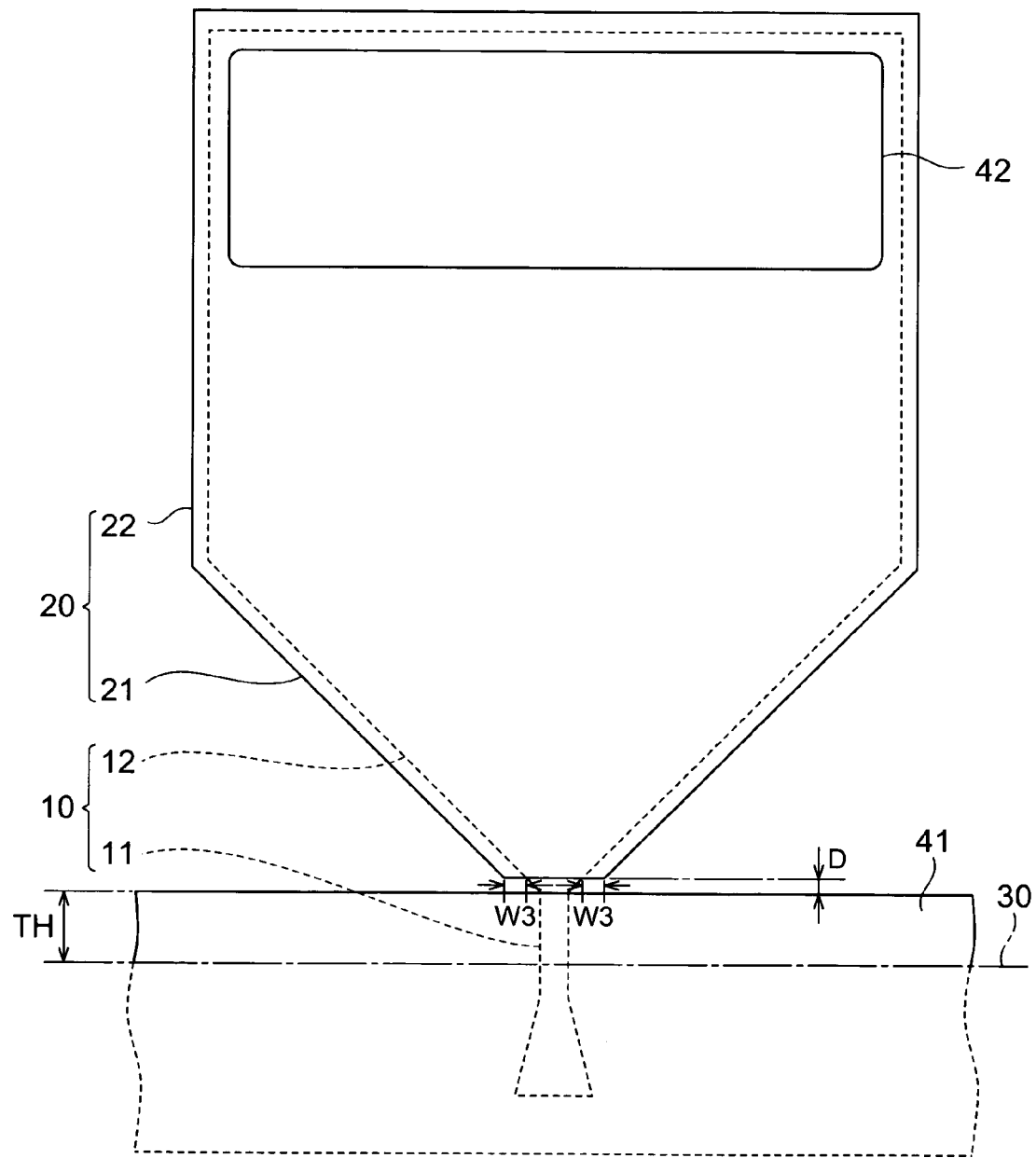
FIG. 2 is a plan view showing the main pole layer, upper yoke pole layer and write shield layer of a thin-film magnetic head.
Figure 3:
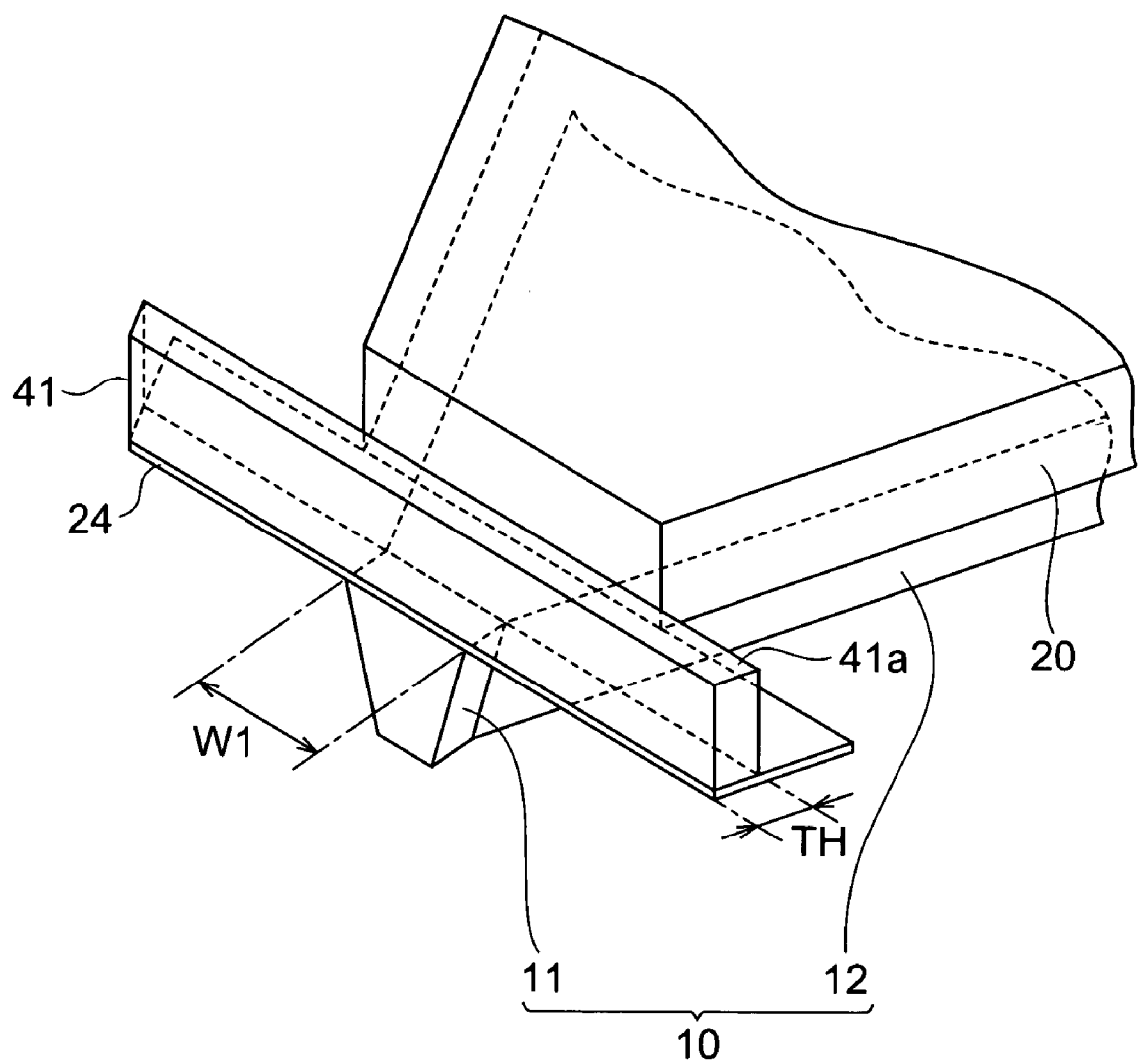
FIG. 3 is a perspective view showing the portion of the main pole layer joined to the upper yoke pole layer.

The structure of a thin-film magnetic head according to the first embodiment of the invention will be explained first, with reference to FIGS. 1 to 3. FIG. 1(A) is a cross-sectional view of a thin-film magnetic head 300 according to a first embodiment of the invention, in the direction crossing the thin-film coil, and FIG. 1(B) is a front view showing the ABS, FIG. 2 is a plan view showing the main pole layer 10, upper yoke pole layer 20 and first shield section 41 of the thin-film magnetic head 300, and FIG. 3 is a perspective view showing the joining portion of the main pole layer 10 and the upper yoke pole layer 20.

The thin-film magnetic head 300 according to the first embodiment is a perpendicular recording type magnetic head having an ABS 30 as the medium-opposing surface opposing the recording medium (hard disk), and it comprises a substrate, a reproduction head with an MR element (magnetoresistance effect element), etc. laminated on the substrate, and recording head. FIGS. 1(A) and (B) show the recording head laminated on an insulating layer 1, but the substrate and reproduction head are not shown. The construction of the essential parts of the thin-film magnetic head 300 is explained below, while the construction of the other parts will be explained afterwards in connection with the manufacturing steps.

The recording head comprises a main pole layer 10, an upper yoke pole layer 20, a recording gap layer 24, a write shield layer 40 and a thin-film coil 100, and is constructed with these elements laminated on the insulating layer 1 on the substrate, which is not shown.

The main pole layer 10 has a magnetic pole tip 11 and a yoke section 12. The main pole layer 10 has a narrow track width structure wherein the lateral width W1 of the pole tip 11 described hereunder is narrowed, in order to give the thin-film magnetic head 300 a high data recording density, and a magnetic material (Hi-Bs material) with a higher saturated flux density than the upper yoke pole layer 20 is used so that the flux will not be saturated even with a narrowed track width structure (this will be described in detail hereunder).

The magnetic pole tip 11 is situated at the ABS 30 side, and comprises a track width specifier with a fixed width which specifies the track width. As shown in FIG. 1B, the magnetic pole tip 11 at the ABS 30 has a lateral width W1 near the thin-film coil 100 in the direction along the ABS 30 and a lateral width W2 distant from the thin-film coil 100, and has a beveled shape such that its lateral width gradually narrows with the distance from the thin-film coil 100 (W1>W2, where the lateral width W1 is the track width). The depth of the magnetic pole tip 11 (the distance from the ABS 30) corresponds to the throat height TH. (For this embodiment, the throat height TH is about 0.1-0.3 µm, and preferably 0.2 µm.)

The yoke section 12 is the section of the main pole layer 10 which is more distant from the ABS 30 than the recording gap layer 24, and it is situated at a location more distant from the ABS 30 than the magnetic pole tip 11. The yoke section 12 has a variable width region wherein the width gradually widens with increasing distance from the ABS 30 and a fixed width region whose width is fixed, and the upper yoke pole layer 20 is joined to the surface at the side near the thin-film coil 100.

The upper yoke pole layer 20 is situated at a position distant from the ABS 30 by a depth D (about 0.5-1.0 µm) and comprises a variable width region 21 wherein the lateral width gradually widens with increasing distance from the ABS 30 and a fixed width region 22 which having a fixed lateral width, and its overall size (area) is larger than the size of the yoke section 12. Also, the upper yoke pole layer 20 is joined to the surface of the yoke section 12 at the side near the thin-film coil 10, so that the yoke section 12 is housed internally. That is, the upper yoke pole layer 20 is joined to the yoke section 12 in such a manner that the peripheral section is situated outward from the yoke section 12. The lateral width W3 of the section protruding outward from the yoke section 12 is approximately 0.5 μm.

Also, the upper yoke pole layer 20 is magnetically connected with the write shield layer 40 at the section distant from the ABS 30, forming a link section 44 with the write shield layer 40.

The recording gap layer 24 is formed between the main pole layer 10 and the first shield section 41 (described hereunder) of the write shield layer 40.

The write shield layer 40 has a first shield section 41, a second shield section 42 and a third shield section 43. The first shield section 41 is the shield tip according to the invention, and it is formed opposing the magnetic pole tip 11 of the main pole layer 10 via the recording gap layer 24, with the throat height TH determined by the depth in the direction crossing the ABS 30 (see FIG. 2). Also, the first shield section 41 has an edge surface 41a which is formed to the same height as the edge surface 20a at the side of the upper yoke pole layer 20 near the thin-film coil 100 (see FIG. 2), and the second shield section 42 is connected to this edge surface 41a.

The second shield section 42 is formed in connection with the first shield section 41 and the upper yoke pole layer 20 from the side near the thin-film coil 100, and has a height equal to the thickness of the thin-film coil 100. The third shield section 43 is formed in connection with the second shield section 42, covering the thin-film coil 100 and photoresist 101 via the insulating layer 32.

The thin-film coil 100 is wound in a planar spiral fashion around the second shield section 42, while insulated with respect to the upper yoke pole layer 20 and write shield layer 40 via the respective insulating layers 31, 32.

The thin-film magnetic head 300 having the construction described above has the upper yoke pole layer 20 joined to the surface at the side of the main pole layer 10 near the thin-film coil 100, and it is formed after the main pole layer 10 (described in detail hereunder). Consequently, since the magnetic pole tip 11 is already formed before the upper yoke pole layer 20, the upper yoke pole layer 20 is not affected by the step of forming the magnetic pole tip 11, and therefore its shape undergoes no change. As a result, the length of the section of narrow width having the track width is determined by the magnetic pole tip 11 and does not deviate from the designed length, so that the length may be set as projected. The upper yoke pole layer 20 can therefore be formed near the ABS 30. In addition, the upper yoke pole layer 20 has a larger size than the yoke section 12 of the main pole layer 10, and its magnetic charge (also known as magnetic volume) is also greater.

Consequently, the thin-film magnetic head 300 may have the upper yoke pole layer 20, which has a greater magnetic charge, situated near the ABS 30, in order to increase the magnetic charge near the ABS 30. As a result, the thin-film magnetic head 300 has a construction which permits a satisfactory overwrite characteristic.

The thin-film magnetic head 300 also has a first shield section 41 wherein the upper yoke pole layer 20 and edge face are formed to the same height, and the first shield section 41 is situated so as to oppose the magnetic tip 11 via the recording gap layer 24 at the ABS 30. This first shield section 41 can absorb magnetic return from the recording medium, to thus prevent leakage of excess magnetism. This allows a satisfactory overwrite characteristic to be maintained even when the upper yoke pole layer 20 is formed near the ABS 30, in order to prevent ATE (Adjacent Track Erase).

In order to increase the data recording density, the lateral width W1 of the magnetic pole tip 11 is narrowed to create a narrow track width structure, and the main magnetic pole 10 is formed using a magnetic material with a higher saturated flux density than the upper yoke pole layer 20 so that the flux is not saturated.

This will now be explained with reference to FIGS. 16(A), (B) and (C). FIGS. 16(A) and (B) are cross-sectional and front views of thin-film magnetic heads 303,304 manufactured by steps different than for the thin-film magnetic head 300, and FIG. 16(C) is a plan view showing the main pole layer 10 and upper yoke pole layer 20, together with the direction of internal magnetization. The thin-film magnetic heads 303,304 differ from the thin-film magnetic heads 301,302 described hereunder in the sizes of the recording gap layer 24.

In the main pole layer 10, the saturated flux density of the magnetic material is higher than the saturated flux density of the upper yoke pole layer 20, and therefore it is difficult to reduce the magnetostriction λ. Consequently, even if the direction of magnetization ms is aligned along the direction ABS 30, the orientation of the remnant magnetization mr of the main pole layer 10 after completion of writing is toward the ABS 30 side and therefore tends to be oriented in another direction which is different from the direction along the ABS.

In the thin-film magnetic head 300, however, since a magnetic material having a lower saturated flux density than the main pole layer 10 can be used for the upper yoke pole layer 20 to reduce the magnetostriction λ, the direction of remnant magnetization of the upper yoke pole layer 20 after completion of writing may be prevented from being directed in the another direction.

Also, since the upper yoke pole layer 20 is joined to the main pole layer 10, the direction of remnant magnetization mr of the main pole layer 10 after completion of writing is corrected by the magnetization of the upper yoke pole layer 20, and to be prevented from being directed in the another direction as shown in FIG. 16(C).

In other words, by joining the upper yoke pole layer 20 with the main pole layer 10, the direction of remnant magnetization mr of the main pole layer 10 after completion of writing is corrected by the magnetization of the upper yoke pole layer 20. Hence, there is no erasure of data already written on the hard disk by leakage flux due to remnant magnetization mr. The thin-film magnetic head 300 can therefore effectively prevent appearance of pole erasure while improving recording density. Pole erasure is the phenomenon wherein, after data has been written on a recording medium (hard disk) having a high maximum coercivity Hc, leakage flux flows from the ABS to the hard disk, even in the absence of a write current flow to the thin-film coil, thus erasing other data.

(Method of Manufacturing Thin-Film Magnetic Head)

A method of manufacturing the thin-film magnetic head 300 according to the first embodiment having the construction described above will now be explained with reference to FIGS. 1(A),(B) to FIG. 3 and FIGS. 4(A),(B) to FIGS. 8(A), (B).

Figures 8A, 8B:
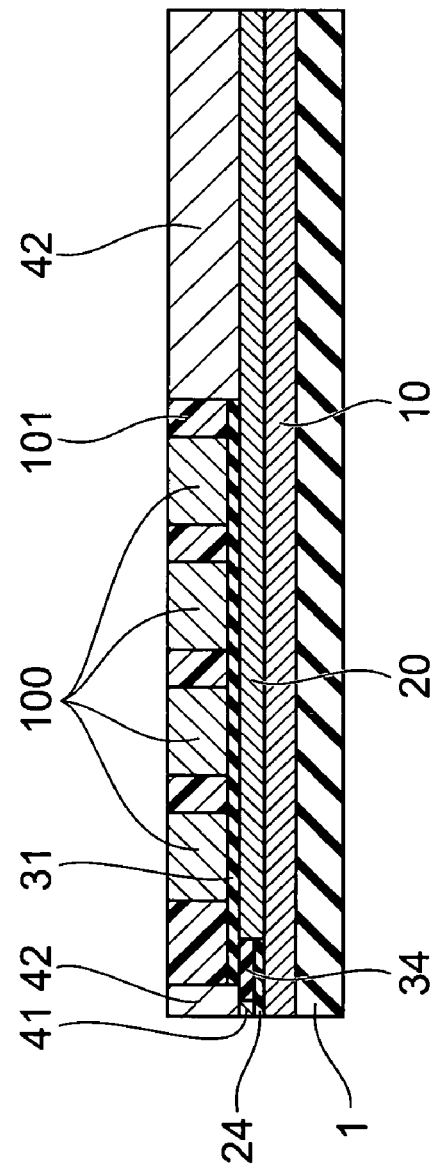
FIGS. 8(A) and (B) are cross-sectional views showing the steps subsequent to FIGS. 7(A) and (B), respectively.

FIGS. 4(A),(B) to FIGS. 8(A),(B) show cross-sectional views of manufacturing steps corresponding to FIGS. 1(A), (B), respectively.

In the manufacturing method of this embodiment, first a reproduction head provided with an MR element (magnetoresistance effect element), etc. is laminated on a substrate (not shown) made of, for example, aluminum oxide/titanium carbide ($Al_2O_3$.TiC), and an insulating layer 1 separating the reproduction head and recording head is formed to a thickness of, for example, about 0.2-0.3 μm.

Next, the insulating layer 1 is coated with a photoresist and a prescribed photomask is used for patterning to form a resist pattern with a taper angle of 7-10° on the ABS 30. The resist pattern is used for plating with CoFe or CoNiFe as the magnetic material having a high saturated flux density of 2.3 T-2.4 T to a thickness of 0.6-0.8 µm, to form a main pole layer 10 having a magnetic pole tip 11 at the ABS 30 side. The electrode film (not shown) formed for the plating is then removed, leaving the condition shown in FIGS. 4(A),(B). The plating is carried out to a thickness of about 0.7 µm.

Next, an insulating section 33 made of alumina ($Al_2O_3$) is formed to a thickness of, for example, 0.5-1.0 µm on the entire surface of the laminated body, and the surface is polished by chemical mechanical polishing (hereinafter "CMP") so that height (insulating section 33 thickness) of main pole layer 10 become about 0.2-0.25 µm, as shown in FIGS. 5(A),(B), for surface flattening treatment. This results in the condition shown in FIGS. 5(A),(B), with the insulating section 33 situated at a location where the main pole layer 10 is absent.

Either before or after the polishing by CMP, at least the surface of magnetic pole tip 11 of the main pole layer 10 may be subjected to annealing at 200-260° C. Annealing can reduce the effect of remnant magnetization inside the magnetic pole tip 11 after completion of writing. The annealing is preferably carried out after formation of the recording gap layer 24 described hereunder.

Next, a coating is formed over the entire top surface of the laminated body to 400-500 Å, to form a recording gap layer 24. The material of the coating may be an insulating material such as alumina or the like, or a non-magnetic metal material such as Ru, NiCu, Ta, W, Cr, $Al_2O_3$, $Si_2O_3$ or the like. The coating is then selectively etched to leave a region at the ABS 30 side, and expose a section of the side distant from the ABS 30 of the main pole layer 10 (the exposed section serving as the aforementioned yoke section 12). This results in formation of a recording gap layer 24 such as shown in FIGS. 6(A),(B).

A plating method is used to form the upper yoke pole layer 20 and the first shield section 41, in the same step, over the entire surface of the laminated body to a thickness of about 0.3-1.0 µm, using NiFe having a saturated flux density of 1.0-1.6 T or CoNiFe having a saturated flux density of 1.9-2.1 T and a small magnetostriction λ and maximum coercivity Hc as the magnetic material. The upper yoke pole layer 20 is formed so that it is joined to the location of the main pole layer 10 which is not covered with the recording gap layer 24, and so that the first shield section 41 is in contact with the ABS 30 side of the recording gap layer 24. The upper yoke pole layer 20 and the first shield section 41 are formed so that their respective edge surfaces have the same height in the subsequent steps. Also, the first shield section 41 is formed at a position which determines the throat height TH, in such a manner as to oppose the magnetic pole tip 11 via the recording gap layer 24 at the ABS 30.

The upper yoke pole layer 20 and first shield section 41 may be formed by a plating method using CoNiFe or NiFe as the magnetic material. A magnetic material such as FeN, FeCoZrO or FeAlN (each magnetic material has a small magnetostriction λ and maximum coercivity Hc and a saturated flux density of 1.9-2.0 T) is used to form a coating by a sputtering method, and the coating may be subjected to reactive ion etching (hereinafter, "RIE") or ion beam etching (hereinafter, "IBE").

Figures 7A, 7B:
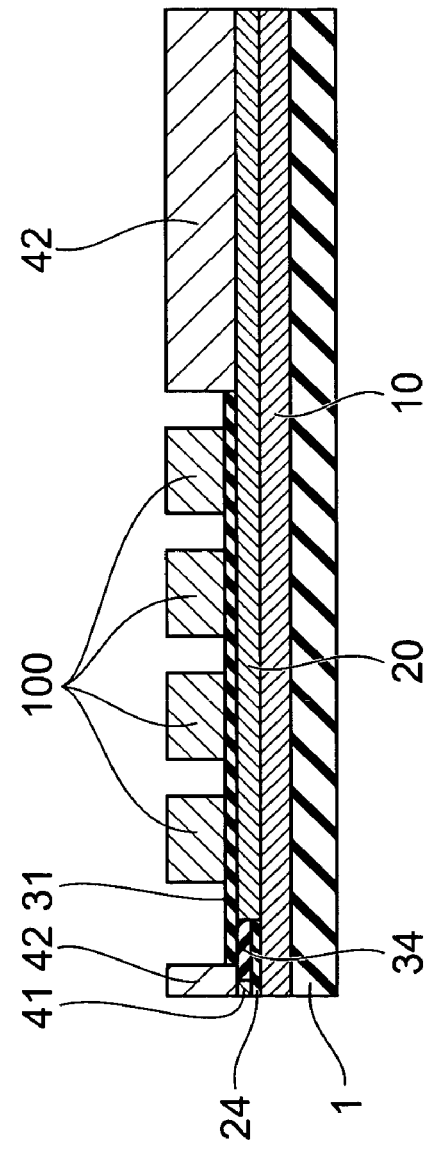
FIGS. 7(A) and (B) are cross-sectional views showing the steps subsequent to FIGS. 6(A) and (B), respectively.

Next, as shown in FIGS. 7(A),(B), an insulating film 34 made of alumina ($Al_2O_3$) is formed over the entire surface of the laminated body to a thickness of, for example, 1.0-1.5 µm. The surface is polished by CMP so that thickness of first shield section 41 and upper yoke pole layer 20 is about 0.3-0.8 µm, for surface flattening treatment. The surface flattening treatment produces edge surfaces of the same height for the first shield section 41 and upper yoke pole layer 20.

Next, an insulating film made of alumina ($Al_2O_3$) is formed over the entire surface of the laminated body to a thickness of about 0.2 µm, and an opening is formed at the locations where the second shield section 42 is to be formed (a location which can be connected to the first shield section 41 and a location which can be connected to the upper yoke pole layer 20). This results in an insulating film 31 for insulation so that shorting does not occur between the thin-film coil 100 and the upper yoke pole layer 20.

Next, a frame is formed on the insulating film 31, using an electrode film (not shown) made of a conductive material and employing photolithography, and then electroplating is carried out using the electrode film to form a plating layer made of Cu. The plating layer and the electrode film below it constitute the thin-film coil 100. The thin-film coil 100 are formed in contact with the upper yoke pole layer 20 via the insulating film 31.

A frame is then formed by photolithography and a second shield section 42 serving as the magnetic shield layer of the invention is formed by frame plating (not shown). The second shield section 42 is formed using the same magnetic material as for the first shield section 41. The second shield section 42 and the thin-film coil 100 may also be formed in the facing order.

Also, as shown in FIGS. 8(A),(B), a photoresist 101 is coated to cover the entire surface of the laminated body, and an insulating film made of alumina ($Al_2O_3$) is formed thereover, after which the entire surface is polished by CMP for flattening treatment of the surface. In this case, the polishing of the surface by CMP is carried out so that the thickness of the thin-film coil 100 and second shield section 42 is about 2.0-2.5 µm.

Next, an insulating film made of alumina ($Al_2O_3$) is formed covering the entire surface of the laminated body, to a thickness of about 0.2 µm, and then an opening is formed at the location where the second shield section 42 is to be formed. This results in an insulating film 32 for insulation so that shorting does not occur between the thin-film coil 100 and the third shield section 43.

When forming the third shield section 43 serving as the magnetic shield layer of the invention, to a thickness of about 2-3 µm, a write shield layer 40 is formed opposing the magnetic pole tip 11 via the recording gap layer 24, in connection with the upper yoke pole layer 20, to obtain a thin-film magnetic head 300 as shown in FIGS. 1(A),(B). The thin-film magnetic head 300 obtained in this manner, having the construction described above, is able to exhibit a satisfactory overwrite characteristic.

Modification Example 1

The manufacturing steps described above may be modified in the following manner. Specifically, as shown in FIGS. 6(A),(B), after the first shield section 41 and upper yoke pole layer 20 have been formed, the thin-film coil 100 may be formed via the insulating film 31, before the second shield section 42. Next, a photoresist 101 may be formed covering the thin-film coil 100. The second shield section 42, serving as the magnetic shield layer of the invention, is then formed covering the photoresist 101, in connection with the first shield section 41 and the upper yoke pole layer 20. This yields a thin-film magnetic head 301 including a write shield layer 40 having a first shield section 41 and second shield section 42, not having a third shield section 43, as shown in FIGS. 14(A),(B).

This thin-film magnetic head 301 differs from the thin-film magnetic head 300 in that it has no third shield section 43, but it otherwise has the same construction and exhibits the same function and effect as the thin-film magnetic head 300. Also, since it does not require a step to manufacture the third shield section 43 in addition to the second shield section 42, the manufacturing steps can be reduced.

Modification Example 2

A tensile film 15 may also be provided in connection with the main pole layer 10, between the insulating layer 1 and the main pole layer 10, as in the thin-film magnetic head 302 shown in FIGS. 15(A) and (B). The tensile film 15 is a high tensile strength film made of Ta, W, Mo, TiW, TiN, Cr, NiCr or the like, and formed with application of a high tensile strength of 200 MPa or greater. By providing the tensile film 15 it is possible to maintain the direction of remnant magnetization mr of the main pole layer 10 after completion of writing in the direction along the ABS 30. Thus, the thin-film magnetic head 302 can effectively prevent appearance of pole erasure.

Modification Example 3

Figure 20:
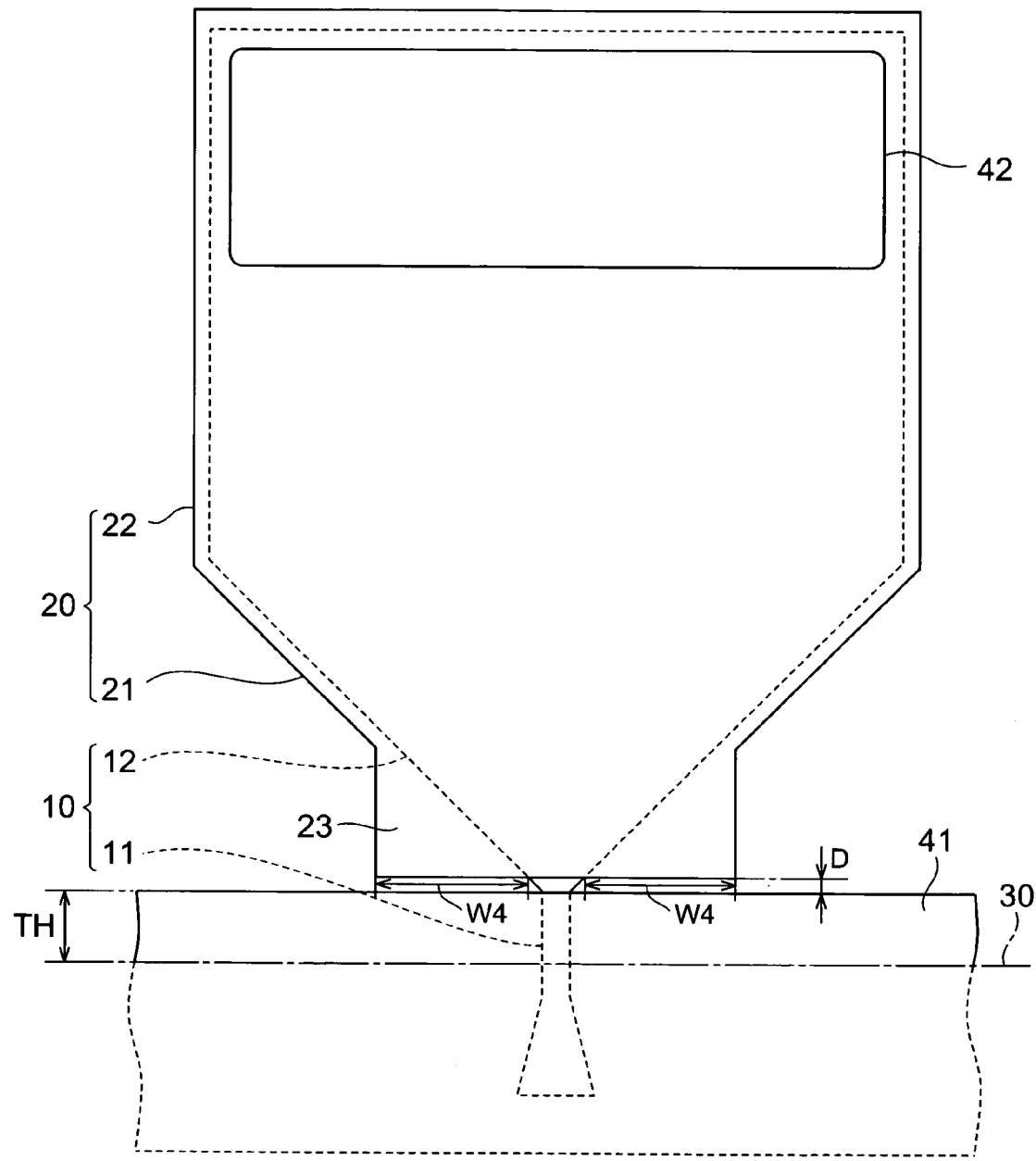
FIG. 20 is a plan view showing the main pole layer of a thin-film magnetic head, and a different upper yoke pole layer and write shield layer.

Also, as shown in FIG. 20, the variable width region 21 of the upper yoke pole layer 20 may be provided with an enlarged region 23 wherein the lateral width is enlarged at the side near the ABS 30 (W4 shown in FIG. 20 has a width of about 0.5-3.0 μm). Such provision of the enlarged region 23 in the upper yoke pole layer 20 will allow the magnetic charge of the upper yoke pole layer 20 to be increased near the ABS 30, so that the overwrite characteristic can be even more satisfactory.

Second Embodiment

A thin-film magnetic head according to a second embodiment of the invention will now be explained with reference to FIGS. 9(A),(B). FIG. 9(A) is a cross-sectional view of the thin-film magnetic head 310 according to the second embodiment of the invention, in the direction crossing the thin-film coil, and FIG. 9(B) is a front view showing the ABS.

(Structure of Thin-Film Magnetic Head)

The thin-film magnetic head 310 according to the second embodiment of the invention differs from the thin-film magnetic head 300 described above primarily in that it has a tensile film 16 similar to the tensile film 15 and in that it has insulating films 35,36 instead of insulating film 34, but is the same in its other aspects. The differences will now be explained, ignoring the aspects which are identical.

The tensile film 16 is formed between the insulating layer 1 and the main pole layer 10, in contact with the main pole layer 10. In this thin-film magnetic head 310, therefore, the tensile film 16 allows the direction of remnant magnetization mr of the main pole layer 10 after completion of writing to be maintained in the direction along the ABS 30, to effectively prevent appearance of pole erasure. The insulating films 35,36 are formed at a position of the recording gap layer 24 which is more distant from the ABS 30 than the first shield section 41.

Since the thin-film magnetic head 310 having this construction likewise has the same main pole layer 10 and upper yoke pole layer 20 as the thin-film magnetic head 300, the construction allows the magnetic charge to be increased near the ABS 30, for a satisfactory overwrite characteristic.

In addition, since it has the same first shield section 41 as the thin-film magnetic head 300, the first shield section 41 can absorb magnetic return from the recording medium, to thus prevent leakage of excess magnetism. This allows a satisfactory overwrite characteristic to be maintained, in order to prevent ATE.

(Method of Manufacturing Thin-Film Magnetic Head)

A method of manufacturing the thin-film magnetic head 310 according to the second embodiment having the construction described above will now be explained with reference to FIGS. 9(A),(B) and FIGS. 10(A),(B) to FIGS. 13(A), (B). FIGS. 10(A),(B) to FIGS. 13(A),(B) show cross-sectional views of manufacturing steps corresponding to FIGS. 9(A),(B), respectively.

In this embodiment, similar to the first embodiment, an insulating layer 1 is formed on a substrate (not shown) to a thickness of, for example, about 0.2-0.3 μm.

Next, as shown in FIGS. 10(A),(B), a tensile film 16 is formed to a thickness of 500-1000 Å on the insulating layer 1.

Next, the main pole layer 10 comprising the magnetic pole tip 11 and yoke section 12 is formed by the same procedure as the first embodiment. FIGS. 9(A),(B) to FIGS. 13(A),(B) show the shield layer 17 used for plating to form the main pole layer 10 comprising the magnetic pole tip 11 and yoke section 12.

Next, polishing by CMP after formation of the insulating section 33 by the same procedure as the first embodiment produces a state which an insulating section 33 fills in the sections where the main pole layer 10 is absent, as shown in FIGS. 11(A),(B). In this embodiment as well, annealing is carried out in the same manner as the first embodiment either before or after the polishing by CMP, or after formation of the recording gap layer 24.

Figure 12A:
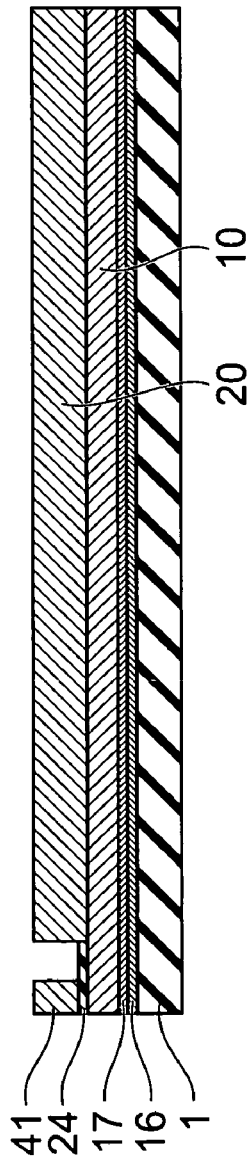
FIGS. 12(A) and (B) are cross-sectional views showing the steps subsequent to FIGS. 11(A) and (B), respectively.
Figure 12B:
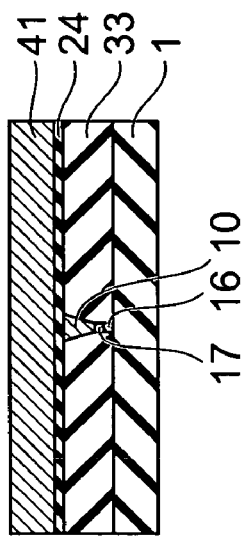

Next, as shown in FIGS. 12(A),(B), the recording gap layer 24, the first shield section 41 and the upper yoke pole layer 20 are formed by the same procedure as the first embodiment.

Figures 13A, 13B:
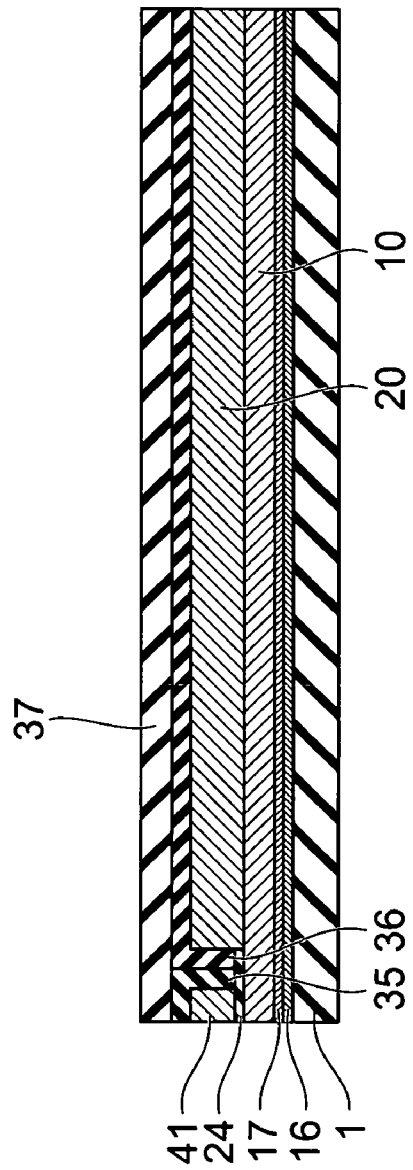
FIGS. 13(A) and (B) are cross-sectional views showing the steps subsequent to FIGS. 12(A) and (B), respectively.

Also, as shown in FIGS. 13(A),(B), a coating made of alumina ($Al_2O_3$) is formed to 1000-3000 Å by AL-CVD, whereby insulating films 35,36 are formed filling in the gap between the first shield section 41 and the upper yoke pole layer 20. Since the AL-CVD results in satisfactory step coverage, it is possible to form the insulating films 35,36 in such a manner that no keyhole is formed in the narrow space between the first shield section 41 and the upper yoke pole layer 20. The insulating films 35,36 may also be coated with alumina ($Al_2O_3$) 37 formed to a thickness of about 0.1-0.5 μm by ALE (Atomic Layer Epitaxy). The alumina ($Al_2O_3$) insulating films 35,36 are alumina CVD films formed by alternating intermittent injection of $H_2O$, $N_2$ or $N_2O$, $H_2O_2$ and $AL(CH_3)_3$ or $ALCL_3$ for forming thin-film, under reduced pressure at a temperature of 180-200° C.

Next, the surface of the insulating films 35,36 are polished by CMP to a thickness of about 0.3-0.5 μm, and an opening is formed at the location where the second shield section 42 is to be formed. This yields an insulating film 31. Also, a thin-film coil 100 and second shield section 42 are formed by the same procedure as for the first embodiment.

Also, an insulating film 32 made of alumina ($Al_2O_3$) is formed thereover to a thickness of 3-4 μm, after which the entire surface is polished by CMP for flattening treatment of the surface. In this case, the polishing of the surface by CMP is carried out so that the thickness of the first shield section 41 and upper yoke pole layer 20 is about 2.0-2.5 μm. The subsequent steps are carried out by the same procedure as for the first embodiment, to obtain a thin-film magnetic head 310 as shown in FIGS. 9(A),(B).

Third Embodiment

Figure 17:
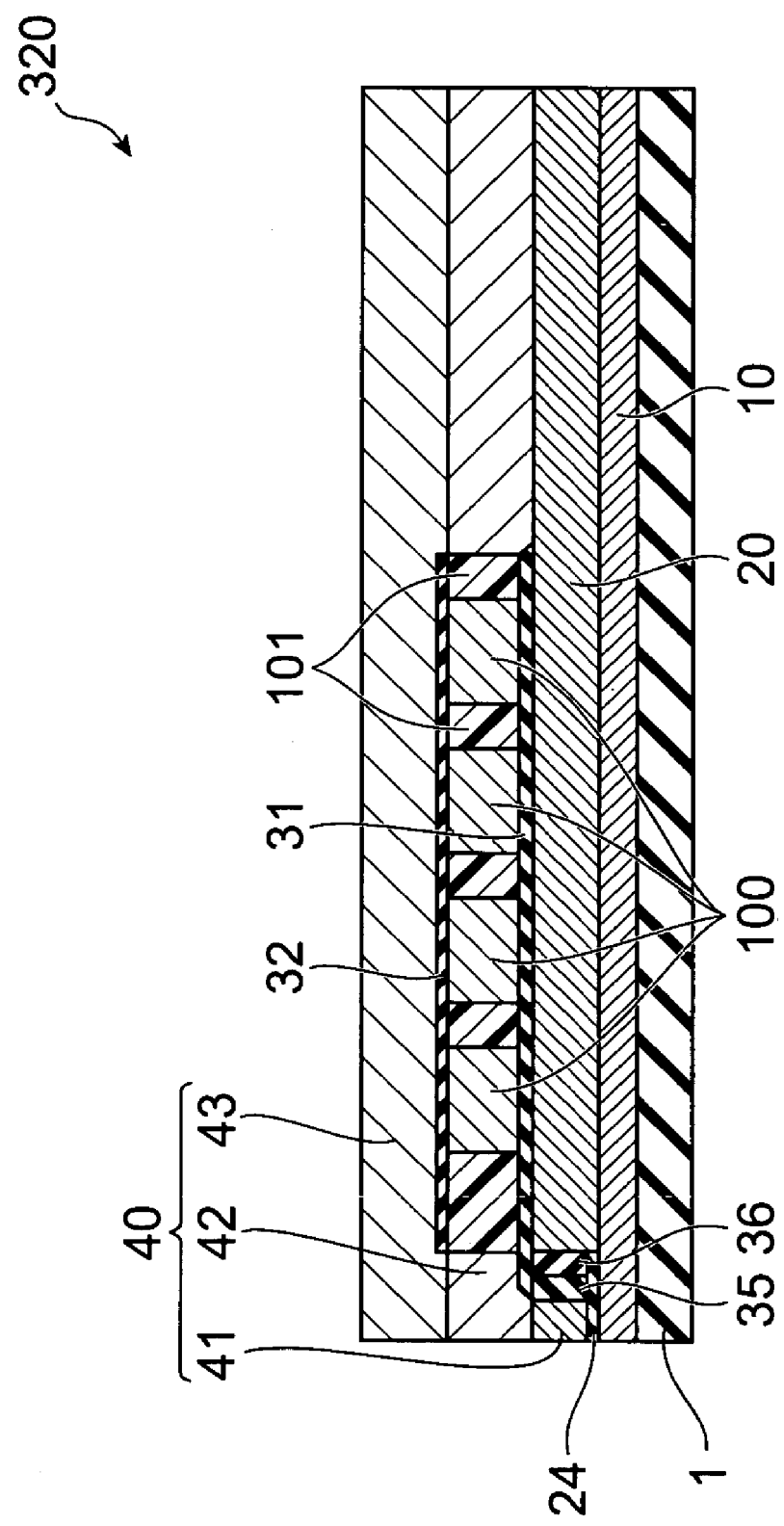
FIG. 17 is a cross-sectional view of a thin-film magnetic head according to a third embodiment of the invention, in the direction crossing the thin-film coil.

A thin-film magnetic head according to a third embodiment of the invention will now be explained with reference to FIG. 17. FIG. 17 is a cross-sectional view of the thin-film magnetic head 320 according to the third embodiment of the invention, in the direction crossing the thin-film coil.

(Structure of Thin-Film Magnetic Head)

The thin-film magnetic head 320 according to the third embodiment of the invention differs from the thin-film magnetic head 310 described above primarily in that it has no tensile film 16 and in that the material of the first shield section 41 is different, while it is the same in its other aspects. The differences will now be explained, ignoring the aspects which are identical.

In the thin-film magnetic heads 300,310 described above, the upper yoke pole layer 20 and first shield section 41 are formed together in the same step using the same magnetic material, and therefore the saturated flux density of the magnetic material of the first shield section 41 is the same as the saturated flux density of the upper yoke pole layer 20.

However, in order to reduce the effect of remnant magnetization after completion of writing, it is preferred for the saturated flux density of the first shield section 41 formed at the ABS 30 side to be low. The first shield section 41 and upper yoke pole layer 20 are therefore formed using different magnetic materials, so that the saturated flux density of the first shield section 41 is at least lower than the main pole layer 10, and preferably lower than the upper yoke pole layer 20.

The magnetic material of the first shield section 41 may be NiFe with a saturated flux density of 1.6 T, and NiFe with a saturated flux density of 1.0 T (80%:20%). Alternatively, the magnetic material of the first shield section 41 may be CoNiFe with a saturated flux density of 1.9 T, and CoFe or CoNiFe having a high saturated flux density of 2.3 T-2.4 T as the magnetic material of the main pole layer 10, while the saturated flux density of the upper yoke pole layer 20 may be the same as, or slightly lower than, the main pole layer 10 (for example, about 1.9 T).

(Method of Manufacturing Thin-Film Magnetic Head)

A method of manufacturing the thin-film magnetic head 320 according to the third embodiment having the construction described above will now be explained with reference to FIG. 17 above, as well as FIGS. 18 and 19.

Figure 18:
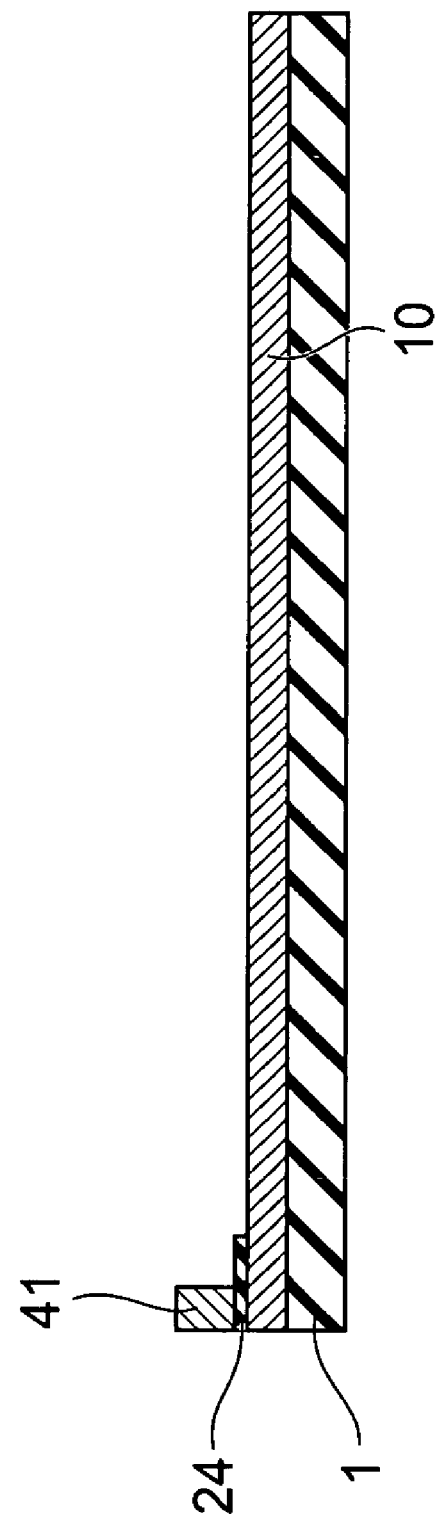
FIG. 18 is a cross-sectional view, corresponding to FIG. 17, for a step of manufacturing a thin-film magnetic head according to the third embodiment.
Figure 19:
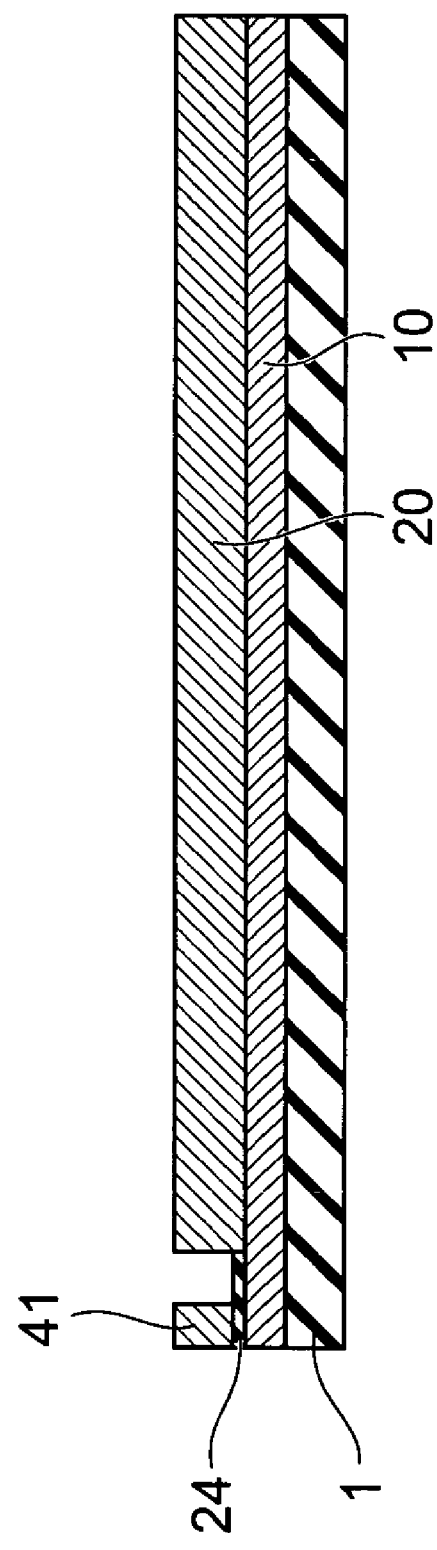
FIG. 19 is a cross-sectional view showing the step subsequent to FIG. 18.

As shown in FIGS. 18 and 19, the thin-film magnetic head 320 has a main pole layer 10 and an insulating layer 33 formed, and a recording gap layer 24 formed thereover, in the same manner as the second embodiment. Next, as explained above, a magnetic material with a saturated flux density at least lower than the main pole layer 10 and preferably lower than the upper yoke pole layer 20 (for example, NiFe with a saturated flux density of 1.0 T (80%:20%)) is used to form a first shield section 41 at a position which determines the throat height TH, so that it opposes the magnetic pole section 11 via the recording gap layer 24 at the ABS 30.

Next, as shown in FIG. 19, an upper yoke pole layer 20 is formed so that it is joined to the location of the main pole layer 10 which is not covered with the recording gap layer 24. The remaining steps are carried out in the same manner as for the second embodiment.

Incidentally, although the thin-film magnetic head 320 has no tensile film 16, it may of course have a tensile film 16 and therefore a step may be included of forming a tensile film 16. At least the surface of the magnetic pole tip 11 of the main pole layer 10 is subjected to annealing.

The present invention may also be applied for a record-only head having only an inductive electromagnetic transducer, or it may be applied for a thin-film magnetic head wherein recording and reproduction are accomplished by an inductive electromagnetic transducer.

(Embodiment of Head Gimbal Assembly and Hard Disk Drive)

An embodiment of a head gimbal assembly and hard disk drive will now be explained.

Figure 21:
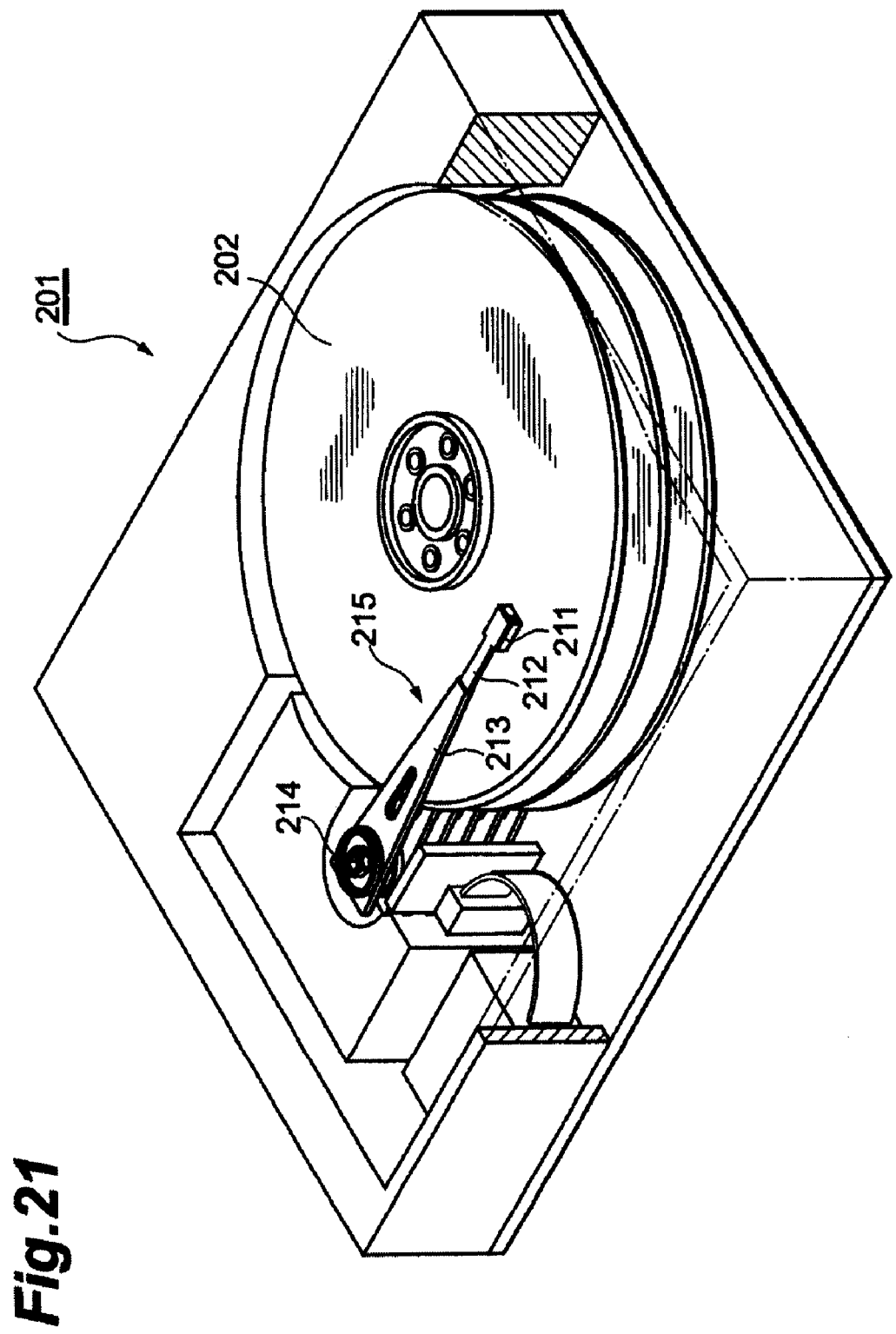
FIG. 21 is a perspective view of a hard disk drive provided with a thin-film magnetic head according to the first embodiment of the invention.

FIG. 21 is a perspective view showing a hard disk drive 201 comprising the above-mentioned thin-film magnetic head 300. The hard disk drive 201 comprises a hard disk (recording medium) 202 rotating at a high speed, and a head gimbal assembly (HGA) 215. The hard disk drive 201 is an apparatus for actuating the HGA 215, so that magnetic information is recorded onto and reproduced from recording surfaces of the hard disk 202. The hard disk 202 comprises a plurality of disks (whose number is 3 in the drawing). Each disk has a recording surface opposing the thin-film magnetic head 300. The HGA 215 comprises a gimbal 212 mounted with a head slider 211 having a support formed with the thin-film magnetic head 300 and a suspension arm 213 for supporting the gimbal 212 which are disposed on the recording surface of each disk, and is rotatable about a shaft 214 by a voice coil motor which is not depicted, for example. As the HGA 215 is rotated, the head slider 211 moves radially of the hard disk 202, i.e., in directions traversing track lines.

Since the HGA 215 and hard disk drive 201 have thin-film magnetic heads 300, it is possible to achieve a satisfactory overwrite characteristic. An HGA 215 and hard disk drive 201 having thin-film recording heads according to the second and third embodiments can likewise achieve satisfactory overwrite characteristics.

It is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head having a laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, and comprising an upper yoke pole layer having a width in a direction along the medium-opposing surface that is larger than a width of said main pole layer in the direction along the medium-opposing surface, wherein said upper yoke pole layer is joined to the side of said main pole layer which is near said thin-film coil, wherein the upper yoke pole layer is planar across an upper surface, wherein said write shield layer has a shield tip which opposes said magnetic pole tip on said medium-opposing surface, and formed with a same surface height as said upper yoke pole layer.

2. A thin-film magnetic head according to claim 1, wherein said main pole layer and said upper yoke pole layer are formed using magnetic materials with different saturated flux densities, and a saturated flux density of said main pole layer is set higher than a saturated flux density of said upper yoke pole layer.

3. A thin-film magnetic head according to claim 1, which further comprises a high tensile strength film made of Ta, W, Mo, TiW, TiN, Cr, NiCr, Mo, Ru or SiN, in contact with said main pole layer.

4. A thin-film magnetic head according to claim 1, wherein said shield tip and said upper yoke pole layer are formed using magnetic materials with different saturated flux densities, and a saturated flux density of said shield tip is set lower than a saturated flux density of said upper yoke pole layer.

5. A thin-film magnetic head according to claim 1, wherein an insulating film by AL-CVD is formed between said shield tip and said upper yoke pole layer.

6. A thin-film magnetic head according to claim 1, wherein said upper yoke pole layer has formed therein an enlarged region wherein a lateral width is enlarged at a side near said medium-opposing surface.

7. A thin-film magnetic head according to claim 1,
wherein said upper yoke pole layer is situated between said thin-film coil and said main pole layer.

8. A thin-film magnetic head according to claim 1,
wherein said thin-film coil is formed on said upper yoke pole layer.

9. A thin-film magnetic head according to claim 1,
wherein said upper yoke pole layer is joined to said main pole layer in such a manner that a peripheral section is situated outward from said main pole layer.

10. A thin-film magnetic head according to claim 1,
wherein said recording gap layer is situated nearer the medium-opposing surface than said thin-film coil excluding a section further away from the medium-opposing surface than said thin-film coil.

11. A thin-film magnetic head according to claim 10,
wherein said upper yoke pole layer is situated between said thin-film coil and said main pole layer.

12. A thin-film magnetic head according to claim 10,
wherein said thin-film coil is formed on said upper yoke pole layer.

13. A thin-film magnetic head according to claim 10,
wherein said upper yoke pole layer is joined to said main pole layer in such a manner that a peripheral section is situated outward from said main pole layer.

14. A head gimbal assembly comprising a thin-film magnetic head formed on a support and a gimbal securing the support, wherein said thin-film magnetic head has a laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, and comprising an upper yoke pole layer having a width in a direction along the medium-opposing surface that is larger than a width of said main pole layer in the direction along the medium-opposing surface, wherein said upper yoke pole layer is joined to the side of said main pole layer which is near said thin-film coil, wherein the upper yoke pole layer is planar across an upper surface, wherein said write shield layer has a shield tip which opposes said magnetic pole tip on said medium-opposing surface, and formed with a same surface height as said upper yoke pole layer.

15. A hard disk drive comprising a head gimbal assembly having a thin-film magnetic head and a recording medium opposing said thin-film recording head;

wherein said thin-film magnetic head has a laminated construction comprising a main pole layer having a magnetic pole tip on a side of a medium-opposing surface opposing a recording medium, a write shield layer opposing said magnetic pole tip forming a recording gap layer, on the side of said medium-opposing surface, and a thin-film coil wound around at least a portion of said write shield layer, and comprising an upper yoke pole layer having a width in a direction along the medium-opposing surface that is larger than a width of said main pole layer in the direction along the medium-opposing surface, wherein said upper yoke pole layer is joined to the side of said main pole layer which is near said thin-film coil, wherein the upper yoke pole layer is planar across an upper surface, wherein said write shield layer has a shield tip which opposes said magnetic pole tip on said medium-opposing surface, and formed with a same surface height as said upper yoke pole layer.

* * * * *